2,907,652
METHOD OF TREATING OPEN HEARTH STEEL

Raymond J. Anderson, Midland, Mich., assignor to The Dow Chemical Company, Midland, Mich., a corporation of Delaware No Drawing. Application December 19, 1955
Serial No. 553,699

3 Claims. (Cl. 75—53)

The invention relates to the manufacture of steel as by the basic open hearth process. It more particularly concerns an improved method of fluxing the molten basic open hearth steel slag.

As is well known in the basic open hearth steel process, the furnace is charged with limestone, scrap, and pig iron, usually molten, in that order. These materials are proportioned so that when the charge is all melted and the lime produced by the calcination of the limestone in situ has risen through the melted charge the carbon content, slag formation, and temperature of the molten bath will permit finishing the heat to make a commercially acceptable steel. The relative amounts of scrap and pig iron either molten or cold are matters of choice determined by economic considerations.

In charging the furnace, which is usually in heated condition from a prior use, the limestone is in fairly large lumps and is distributed over the bottom of the furnace. Iron ore may be included in the charge and if so included is usually added after the limestone, although sometimes the ore is charged with the limestone. The steel scrap is scattered over the top of the other ingredients of the charge. As the operation proceeds, the charge is subjected to heating by hot combustion gases directed over the top of the charge. Soon pools of molten metal form as the scrap melts down and the temperature approximates 2500° F. At about this temperature, molten pig iron, if used, is added to the charge. At this stage the rest of the scrap melts rapidly and various chemical changes begin. A condition referred to as the "ore boil" follows the addition of the molten pig iron to the charge and is the beginning of the refining stage of the heating process in which impurities in the metal begin to undergo chemical change and enter the slag which forms and floats over the molten metal. Impurities of silicon and manganese are converted to oxides which enter the slag. The oxidation of carbon follows as the heating proceeds yielding carbon monoxide gas, the rising bubbles of which cause agitation of the bath. Phosphorous becomes oxidized entering the slag as an oxide and sulfur becomes CaS in the slag. The stage in the heating process at which the evolution of the carbon monoxide which takes place in a more or less smooth flow of bubbles is referred to as the "ore boil." As the heating proceeds further the carbon content of the molten metal declines, the ore boil subsides and the rate of calcination of the limestone to form lime and carbon dioxide increases which results in a more vigorous evolution of gas and consequently more violent agitation. This stage of the heat is referred to as the "lime boil." The lime so-formed rises to the top of the bath as lumps somewhat smaller than the original pieces of limestone and more or less dissolves gradually in the slag already present. The agitation produced by the evolved gases during the lime boil helps to equalize the temperature and chemical composition throughout the molten metal. The "working period" begins as the ore boil and lime boil subside.

The condition and composition of the slag is important in achieving the objectives of the operation of the open hearth. It must not only absorb many of the impurities from the underlying molten metal but also permit adequate transfer of heat from the combustion gases to the molten metal. As the carbon content of the metal declines during the process the melting point of the molten metal rises and the rate of heat input to the metal charge must be increased to prevent freezing. A tendency to freeze may result also from the addition of iron oxide and other additaments which may be required during the purifying operation.

To succeed well in its various functions, it is desirable to be able to maintain the slag in a fluid state. This is especially desirable during the lime boil when the lime is rising to the surface and as the need for speeding up heat transfer to the melt arises and the slag must be in mobile condition. Pieces of lime floating on the melt do not readily become absorbed in the slag and it tends to foam and froth from the passage through it of the gases evolved from the molten metal. In the frothy or foamy state, the slag hinders the transfer of heat from the combustion gases to the metal.

Heretofore, in attempting to cope with these difficulties, crushed fluorspar ($CaF_2$) has been charged into the furnace usually in part by the charging machine to fluidize the slag and in part by throwing the material onto the "floaters," that is the pieces of lime which have risen through the melt but have not become absorbed by the slag. At least a part of the fluorspar required may be included in the original furnace charge.

Various disadvantages inure to this practice which militate against its usefulness. For example some of the fluoride vaporizes and enters the atmosphere causing undesirable pollution. The fluorspar is a strategic material and at times in short supply or unavailable. The fluoride reduces the usefulness of the slag, a voluminous by-product of the open hearth, for fertilizer use, although it contains phosphorus, because the phosphorus in it is rendered unavailable for assimilation by vegetation.

It is a desideratum in the art therefore to provide a method of fluxing basic open hearth steel slag which overcomes the foregoing difficulties attendant upon the conventional practice.

It is an object of the invention to provide an economical method of increasing the fluidity of basic slag in the open hearth method of making steel which does not require the use of strategic material.

It is a further object to provide an effective method of dispelling floaters and promoting their merging with the slag of the basic open hearth method of making steel.

It is still another object of the invention to promote fluidity and heat transfer characteristics of basic open hearth slag without detracting from its usefulness as a fertilizer material.

Other objects and advantages will appear as the description of the invention proceeds.

The invention is predicated upon the discovery that substantially anhydrous calcium chloride (less than 2 percent by weight of $H_2O$ or preferably less than 0.5 percent $H_2O$) used in similar manner to the conventional use of calcium fluoride in the basic open hearth steel process achieves the desired fluxing action without the foregoing disadvantages of calcium fluoride. The invention then consists of the improved method of fluxing basic open hearth steel slag herein fully described and particularly pointed out in the claims.

In carrying out the invention, the furnace is charged in the usual manner as by putting in the required amounts of limestone, ore, scrap iron or steel, and pig iron. If desired, some of the calcium chloride required for fluxing may be introduced into the furnace with a charging box, along with the limestone, in place of calcium fluoride if it were to be used. The appropriately charged open hearth is heated as in the usual practice thereby melting down the metal and bringing the heat through the ore boil and lime boil stages. At about this time (as when $CaF_2$ would be added in conventional fluxing practice) the bulk of the calcium chloride required for fluxing is added as by means of the charging machine. Subsequently if floaters appear substantially anhydrous calcium chloride is spotted on them thereby fluxing them and bringing about merging with the slag. In this connection, it is found that fewer floaters appear when calcium chloride has been charged into the furnace in accordance with the invention and the few floaters that subsequently may appear can be dispelled with a relatively small amount of fluorspar or by the conjoint use of fluorspar and substantially anhydrous calcium chloride or as aforesaid by the anhydrous calcium chloride alone. The slag, which during the process may become either frothy or viscous, is fluidized by additions of substantially anhydrous calcium chloride as by introducing it into the furnace onto the slag as needed by means of a charging machine. As the working period continues further additions of substantially anhydrous calcium chloride may be made from time to time as needed to maintain the slag in the desired fluid condition.

The amount of substantially anhydrous calcium chloride charged into the furnace, both initially, that is when making up the furnace charge, and during the process of shaping up the slag will range from about 2 to 20 pounds of anhydrous calcium chloride per ton of poured steel.

In various tests of the method of the invention using substantially anhydrous calcium chloride (herein below described) charged into open hearth steel furnaces of 250 tons capacity, besides the advantages already mentioned, it was discovered that the rate of reduction of the carbon content of the bath of metal was increased by the use of the calcium chloride. This is a desirable result for it permits more heats to be made with a given furnace in a unit of time. It was also discovered that atmospheric pollution by chloride in the working area of the furnace was nil. For example, in one 250 ton heat, after a substantial layer of slag had formed, 1400 pounds of substantially anhydrous calcium chloride, packaged in paper bags of 100 pounds capacity, was dumped onto the slag with a conventional charging machine. Two minutes later and for the following 24 minutes the atmosphere 7 feet above the operating floor level and 10 feet from the furnace was sampled continuously. No solid chloride was found. Six minutes after sampling the atmosphere no floaters appeared but the slag required additional thinning. At this time 4 more paper bags each containing 100 pounds of the same calcium chloride were loaded into the furnace with the charging machine. The slag was thereby fluidized. The heat when finished was poured into a holding ladle, the pouring being 53 minutes after the last mentioned addition of calcium chloride. The pouring required 7 minutes. Twenty minutes after pouring into the ladle the metal was cast into ingot molds. It appeared that the amount of iron ore needed for refining the charge could be reduced by about 25 pounds per ton of poured steel. The carbon content of the charge decreased from 1.37 percent to 0.38 percent long before it was expected to occur compared with conventional fluxing of the slag. The results of air sampling also showed that the use of calcium chloride as a flux in accordance with the invention did not present a health hazard to the open hearth operators.

In the foregoing tests, the calcium chloride used had the following analysis: $CaCl_2$ 95.7%; $MgCl_2$ 0.02%; NaCl 1.10%; KCl 2.8%; sulfate $(SO_4)$ 0.12%; parts per million of Fe 51; balance being undetermined impurities including water which did not exceed 0.2%.

In practicing the invention, it is not essential for the substantially anhydrous calcium chloride to be pure although only a very small water content can be tolerated, the limit of water being about 2 percent by weight. Small amounts of other chlorides normally associated with calcium chloride in nature (sea water, natural brines) such as alkali and alkali earth metal chlorides, e.g. NaCl, KCl, $MgCl_2$, may be present such as amounts up to about 6 percent by weight without detriment along with small amounts, not to exceed about 1 percent, of other impurities.

I claim:

1. In the method of making basic open hearth steel in which the charge of metal is brought to the lime boil stage the improvement which comprises adding to the slag floating on the charge during the lime boil stage solid substantially anhydrous calcium chloride in amount between about 2 and 20 pounds per ton of molten metal in the charge, said substantially anhydrous calcium chloride comprising at least 91 percent of $CaCl_2$, the balance being other metal chlorides, impurities not exceeding about 1 percent, and not more than 2 percent of water by weight, said addition being made while the charge of metal is in the open hearth furnace.

2. The method according to claim 1 in which floaters appearing upon the molten metal are treated by depositing on them substantially anhydrous calcium chloride in amount sufficient to induce merging of the floaters with the slag.

3. The method according to claim 1 in which floaters appearing upon the molten metal are subjected to the additional treatment of depositing on them fluorspar in amount sufficient to induce merging of the floaters with the slag.

References Cited in the file of this patent

UNITED STATES PATENTS

| | | |
|---|---|---|
| 130,787 | Bradley et al. | Aug. 27, 1872 |
| 208,561 | Schulze-Berge et al. | Oct. 1, 1878 |
| 1,361,383 | Henderson | Dec. 7, 1920 |

FOREIGN PATENTS

| | | |
|---|---|---|
| 8,612 | Great Britain | 1892 |
| 23,534 | Great Britain | 1892 |

OTHER REFERENCES

Camp and Francis: The Making, Shaping and Treating of Steel, sixth edition, published by United States Steel Co., Pittsburgh, Pa. (page 439 relied upon).